A. M. LOFLAND.
METAL WHEEL.
APPLICATION FILED SEPT. 12, 1914.
1,209,181.
Patented Dec. 19, 1916
Fig. 1.
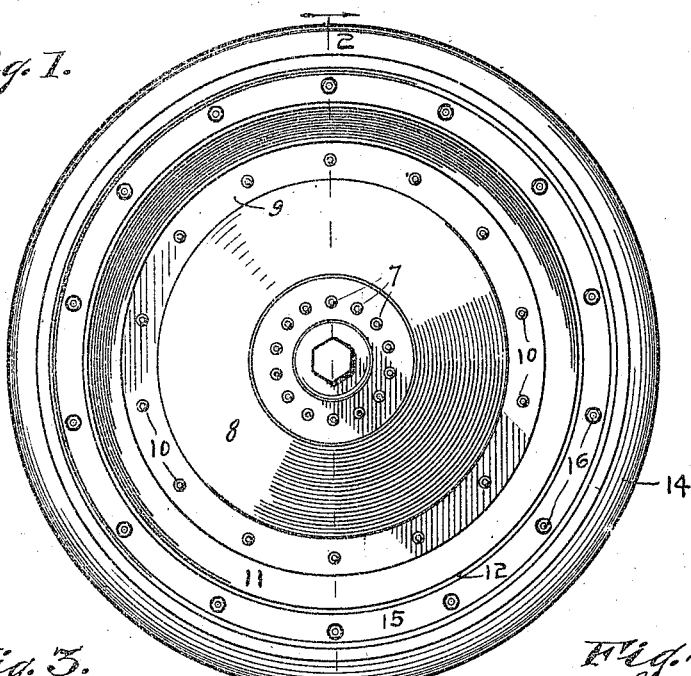
Fig. 3.
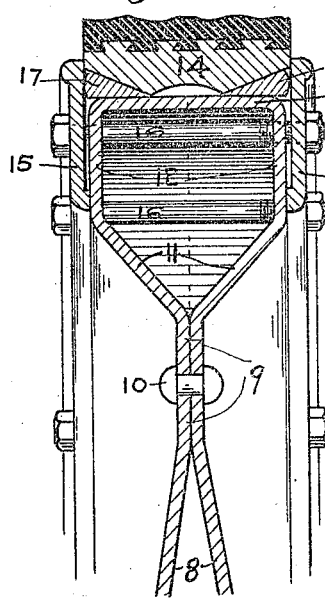
Fig. 2.
Fig. 4.
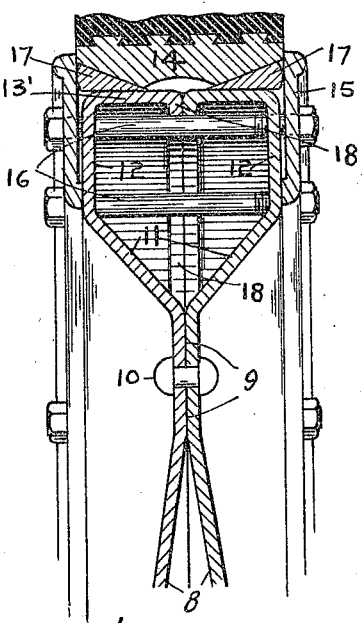
WITNESSES:
L. B. Woerner.
I. L. Larson.
INVENTOR:
Alfred M. Lofland,
By Munturn & Woerner
Attorneys.

UNITED STATES PATENT OFFICE.

ALFRED M. LOFLAND, OF LEBANON, INDIANA.

METAL WHEEL.

1,209,181.  Specification of Letters Patent.  Patented Dec. 19, 1916.

Application filed September 12, 1914. Serial No. 861,346.

*To all whom it may concern:*

Be it known that I, ALFRED M. LOFLAND, a citizen of the United States, residing at Lebanon, in the county of Boone and State of Indiana, have invented certain new and useful Improvements in Metal Wheels, of which the following is a specification.

This invention relates to construction of sheet metal wheels for vehicles such as motor trucks, and the like, which are designed for carrying heavy loads, and the object is to form the wheel out of two disk-members which are oppositely dished from the hub to the felly, and integral portions of which are formed into a strong and rigid hollow felly of correct dimensions to receive any of the standard demountable solid or pneumatic tires.

One of the principal objects is so to form the hollow felly that it will withstand the pressure applied to it by the bolts which are passed through it in attaching the tire-holding rings and clamping the rings against the locking wedges and tire.

I accomplish the above, and other objects which will hereinafter appear, by the mechanism illustrated in the accompanying drawing, in which—

Figure 1 is an outer side elevation of a wheel made in accordance with my invention. Fig. 2 is a cross section on the line 2—2 of Fig. 1. Fig. 3 is a fragment showing the upper end of the section illustrated in Fig. 2 but on a much larger scale, and Fig. 4 is a section similar to Fig. 3 of a modified construction.

Like characters of reference indicate like parts throughout the several views of the drawing.

Referring to the drawing, the hub 5 is of cast metal in the usual form having an outside annular flange 6 of ample dimensions and preferably cored out hollow to reduce the weight. The remainder of the wheel, comprising the felly and its connection with the hub is formed out of two sheet-metal disks which are centrally perforated to fit over the respective hub-ends against opposite sides of the flange 6 to which flange they are secured by rivets 7. Immediately beyond the limits of the flange 6 the two disks are dished inwardly, and toward each other at 8, and meet at 9 in the middle plane of the wheel where they are permanently united by rivets 10. Annular areas 9 of contacting members which are parallel with the plane of the wheel are of sufficient extent to form a substantial bearing and beyond these areas the disks are bent outwardly and oppositely from each other to form the oblique portions 11 which constitute the inner boundaries of the felly.

The sides 12 of the felly are formed by bending the oblique portions 11 radially and outwardly of the wheel in planes parallel with each other and separated a distance equal to the desired transverse width of the felly. The outer periphery 13 of the felly is formed by bending the two disks inwardly at right angles to the sides 12 and by welding together the contacting edges of the flanges thus produced.

I have shown a solid tread tire 14 of usual construction which is located between a pair of side rings 15, placed upon opposite sides of the felly and secured thereto by bolts 16 which pass through both side rings and through the felly adjacent to the peripheral member 13. Locking wedges 17 are inserted between the tire and periphery 13 of the felly and are contacted by the side rings 15 and are forced inwardly by the latter by tightening the nuts on the bolts 16. This tightening operation requires the felly to be rigid and unyielding which construction I secure by welding together the abutting edges of the flanges forming the wheel periphery 13, thereby uniting the two disks practically into one in the finished product.

In the modification shown in Fig. 4, the flanges forming the periphery 13' are provided with abutting inturned edges 18 which are long enough to contact the ring-holding bolts 16. This construction prevents the buckling of the flanges forming the periphery 13' and secures the requisite felly-strength and rigidity without welding.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents, as circumstances may suggest or necessity render expedient.

I claim:

1. The combination of a pair of sheet metal disks contacting in a plane at the middle of the wheel, means for fastening the disks together in said meeting plane, said disks continuing thence in outwardly oblique directions forming the inner member of a felly, and from said inner member outwardly and parallel with each other forming the sides of the felly and from said sides inwardly at right angles to the latter forming the annular outer periphery of the felly, and bolts passing transversely through the felly close to the rim.

2. The combination, in a wheel of a pair of sheet-metal disks having an annular contacting portion near the periphery of the wheel, said disks continuing thence in outwardly oblique directions forming the inner member of a felly, and from said inner member outwardly and parallel with each other forming the sides of the felly and from said sides inwardly at right angles to the latter forming the annular outer periphery of the felly, a tire surrounding said felly, and means for securing the tire to the felly comprising bolts passing through the felly, the adjacent edges of the two disks in said felly periphery being inturned and continued into contact with said bolts to prevent the buckling and distortion of said periphery.

3. The combination, in a wheel of a pair of sheet-metal disks having an annular contacting portion near the periphery of the wheel, said disks continuing thence in outwardly oblique directions forming the inner member of a felly, and from said inner member outwardly and parallel with each other forming the sides of the felly and from said sides inwardly at right angles to the latter into contact with each other thereby completing the felly-closure, a tire surrounding said felly, and means for securing the tire to the felly comprising bolts passing through the felly.

4. The combination, in a wheel of a pair of sheet-metal disks having an annular contacting portion near the periphery of the wheel, said disks continuing thence in outwardly oblique directions forming the inner member of a felly, and from said inner member outwardly and parallel with each other forming the sides of the felly and from said sides inwardly at right angles to the latter forming the annular outer periphery of the felly, means to prevent the buckling and distortion of said periphery, a tire surrounding said felly, and means for securing the tire to the felly comprising bolts passing through the felly.

In witness whereof, I, have hereunto set my hand and seal at Indianapolis, Indiana, this 27th day of August, A. D. one thousand nine hundred and fourteen.

ALFRED M. LOFLAND. [L. S.]

Witnesses:
J. A. COONS,
JOHN HUHER.